Patented June 26, 1923.

1,459,900

UNITED STATES PATENT OFFICE.

MARK E. PUTNAM AND JOHN McCREADIE, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING SALICYLATES.

No Drawing.  Application filed February 21, 1921. Serial No. 446,745.

*To all whom it may concern:*

Be it known that we, MARK E. PUTNAM and JOHN McCREADIE, citizens of the United States, and residents of Midland, county of Midland, State of Michigan, have jointly invented a new and useful Improvement in Methods of Making Salicylates, of which the following is a specification, the principle of the invention being herein explained and the best mode in which we have contemplated applying that principle, so as to distinguish it from other inventions.

The therapeutic properties of salicylic acid and its salts have long been recognized as of very great value, particularly in the treatment of rheumatism. The sodium salt

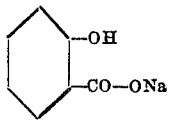

is the one most generally used and its manufacture well established, the standard process involving the neutralization of salicylic acid with either sodium carbonate or bicarbonate, the filtration of the resulting solution and its concentration to the point where the sodium salicylate crystallizes out. This method of preparation is attended with a number of objectionable features which apparently it has not been thought possible to eliminate. Thus, due to the high degree of solubility of the salt approximately half will remain in the mother liquor upon concentration to the point of crystallization as just described; the crystals are difficult to separate due to their character and when separated invariably carry along certain organic coloring matters, so that the product when redissolved does not give a water-white solution but one that is light brown in color; and this same organic coloring matter persists, of course, in the mother liquor, so that after separating out the crytals as above decribed the latter cannot be reconcentrated and a further batch of crystals obtained therefrom, for the reason that these are so highly colored as to render the product unsuited for pharmaceutical use. It has accordingly been the practice to work up the residual mother liquor into salicylic acid for use over again in making further sodium salicylate.

As indicated, the object of the present invention is to produce a salt that will be free from the objectionable coloring matter and at the same time simplify the procedure so as to greatly reduce the labor involved and the amount of apparatus required in carrying on the process.

To the accomplishment of the foregoing and related ends the invention then consists of the steps hereinafter fully described and particularly set forth in the claims, the following description setting forth but several of the various ways in which the principle of the invention may be used.

According to the present improved process we use the same starting materials, namely salicylic acid and sodium carbonate (or bicarbonate). Before concentrating the neutralized solution, however, we add a small quantity of a soluble metallic salt, preferably a tin salt, then heat and pass hydrogen sulphide through the solution. As a specific example, we may add one-half of one per cent of tin salicylate by weight, the reference being to the weight of the sodium salicylate in the solution and not to the total weight of the solution. The term "small percentage", as hereinafter used in this connection, may accordingly be understood as referring to approximately one-half of one per cent of the salt thus added, relatively to the sodium salicylate in the solution. The hydrogen sulphide will of course precipitate the tin as tin sulphide and along therewith the objectionable impurities in the form of organic coloring matters, etc. are likewise carried down, leaving a perfectly clear solution of sodium salicylate, with a small percentage of free salicylic acid. This solution, after separating such precipitate, may then be concentrated under a vacuum, with stirring, to complete dryness, all of the dissolved sodium salicylate being directly recovered in a single operation and without leaving any residual mother liquor to be retreated. The salt forms a flaky soapy precipitate that may be stirred in the fashion indicated until all traces of moisture are driven off.

In place of tin salicylate, tin chloride may be substituted in approximately equal amount and the tin precipitated as before by passing hydrogen sulphide through the solution. In this case, however, sodium chloride will be formed, a double decomposition taking place immediately upon the addition of the chloride i. e. the sodium and chlorine uniting to form such sodium chloride, leaving the tin to form tin salicylate. The relative amount of sodium chloride, however, is extremely small and does not necessarily constitute an objectionable ingredient in the final product. We prefer to employ the stannous form of tin salts, although the stannic will serve. We have also found that the equivalent lead salts (lead being along with tin a common metal of the fourth group, secondary series of the periodic system) produce satisfactory results, but not as goods as such tin salts. The tin, in other words, apparently has some special affinity for the impurities that it is desired to remove, a complex compound being formed and not simply stannous sulphide, as a result of the treatment with hydrogen sulphide.

The concentration of the purified solution is preferably carried on in an enameled apparatus, but at that is relatively simple compared with the standard process first described above, in that the materials require to be handled only once and the several steps may be expeditiously carried out. The resulting product when redissolved is found to produce a water-white solution indicating the thorough character of the purification effected. Obviously, the process in hand is equally applicable to other alkali-metal, as well as alkali earth, salts of salicylic acid, e. g. to potassium, ammonium, strontium and magnesium salicylate. It should further be noted that in the step of neutralizing the acid, it is at present the recognized practice to leave the solution slightly acid, for if left, even slightly on the alkaline side, the solution upon standing becomes highly discolored. This practice is accordingly to be understood as implied in any reference herein made to the step in question.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making an alkali-metal salt of salicylic acid, the steps which consist in neutralizing a solution of such acid with a carbonate of the desired metal, adding to the neutralizing solution a small percentage, relatively to the amount of the resulting alkali-metal salicylate present, of a soluble salt of a common metal of the fourth group, secondary series of the periodic system, passing hydrogen sulphide through such solution, separating the latter from the resultant precipitate, and concentrating such solution to dryness.

2. In a method of making an alkali-metal salt of salicylic acid, the steps which consist in neutralizing a solution of such acid with a carbonate of the desired metal, adding to the neutralized solution a small percentage, relatively to the amount of the resulting alkali-metal salicylate present, of a soluble tin salt, passing hydrogen sulphide through such solution, separating the latter from the resultant precipitate, and concentrating such solution to dryness.

3. In a method of making an alkali-metal salt of salicylic acid, the steps which consist in neutralizing a solution of such acid with a carbonate of the desired metal, adding to the neutralized solution a small percentage, relatively to the amount of the resulting alkali-metal salicylate present, of tin salicylate, passing hydrogen sulphide through such solution, separating the latter from the resultant precipitate, and concentrating such solution to dryness.

4. In a method of making sodium salicylate, the steps which consist in neutralizing a solution of such acid with sodium carbonate, adding tin salicylate to the neutralized solution in amount approximately one-half of one per cent by weight of the sodium salicylate present, heating, passing hydrogen sulphide through such solution, separating the latter from the resultant precipitate, and concentrating such solution to dryness.

5. The method of purifying an alkali-metal salt of salicylic acid, which consists in adding to a solution thereof a small percentage, relatively to the amount of salicylate present, of a soluble salt of a common metal of the fourth group, secondary series of the periodic system, passing hydrogen sulphide through such solution, and separating the latter from the resulting precipitate.

6. The method of purifying sodium salicylate, which consists in adding to a solution thereof a small percentage relatively to the amount of the resulting sodium salicylate present, of a soluble tin salt, passing hydrogen sulphide through such solution, and separating the latter from the resulting precipitate.

7. The method of purifying sodium salicylate, which consists in adding tin salicylate to a solution thereof in amount approximately one-half of one percent by weight of the sodium salicylate present, passing hydrogen sulphide through such solution, and separating the latter from the resulting precipitate.

Signed by us, this 18th day of February, 1921.

MARK E. PUTNAM.
JOHN McCREADIE.